(12) United States Patent  (10) Patent No.: US 8,466,411 B2
Arai  (45) Date of Patent: Jun. 18, 2013

(54) CALIBRATION METHOD OF UV SENSOR FOR UV CURING

(75) Inventor: Hirofumi Arai, Sagamihara (JP)

(73) Assignee: ASM Japan K.K., Tokyo (JP)

( * ) Notice: Subject to any disclaimer, the term of this patent is extended or adjusted under 35 U.S.C. 154(b) by 214 days.

(21) Appl. No.: 13/040,013

(22) Filed: Mar. 3, 2011

(65) Prior Publication Data

US 2012/0223220 A1 Sep. 6, 2012

(51) Int. Cl.
G01D 18/00 (2006.01)
G01R 31/26 (2006.01)

(52) U.S. Cl.
USPC ............................ 250/252.1; 438/16; 438/17

(58) Field of Classification Search
USPC .................................. 250/252.1; 438/16, 17
See application file for complete search history.

(56) References Cited

U.S. PATENT DOCUMENTS

| 6,296,909 | B1 | 10/2001 | Spitsberg |
| 6,759,098 | B2 | 7/2004 | Han |
| 7,501,292 | B2 * | 3/2009 | Matsushita et al. ............. 438/16 |
| 7,935,940 | B1 * | 5/2011 | Smargiassi ................. 250/492.1 |
| 2004/0079960 | A1 | 4/2004 | Shakuda |
| 2004/0080697 | A1 | 4/2004 | Song |
| 2009/0023229 | A1 | 1/2009 | Matsushita |

* cited by examiner

*Primary Examiner* — David Porta
*Assistant Examiner* — Kenneth J Malkowski
(74) *Attorney, Agent, or Firm* — Snell & Wilmer L.L.P.

(57) ABSTRACT

A method for managing UV irradiation for treating substrates in the course of treating multiple substrates consecutively with UV light, includes: exposing a first UV sensor to the UV light at first intervals to measure illumination intensity of the UV light so as to adjust the illumination intensity to a desired level based on the measured illumination intensity; and exposing a second UV sensor to the UV light at second intervals to measure illumination intensity of the UV light so as to calibrate the first UV sensor by equalizing the illumination intensity measured by the first UV sensor substantially with the illumination intensity measured by the second UV sensor, wherein each second interval is longer than each first interval.

20 Claims, 8 Drawing Sheets

CALIBRATION METHOD OF UV SENSOR FOR UV CURING

BACKGROUND

1. Field of the Invention

The present invention generally relates to a method for calibrating a UV sensor and a method for controlling UV irradiation for curing a semiconductor substrate using the calibration method.

2. Description of the Related Art

Conventionally, UV irradiation apparatuses have been commonly used for the modification of various processing targets with UV light and the production of substances by means of photochemical reaction. The recent trend of higher integration of devices results in increasingly finer wiring designs and multi-layer wiring structures, which gives rise to a need to reduce the interlayer volume in order to increase the device speed while reducing the power consumption. One method of reducing the interlayer volume is to cure a low-k material through UV irradiation and thereby increase its mechanical strength (for example, U.S. Pat. No. 6,759,098 and U.S. Pat. No. 6,296,909).

In the UV irradiation apparatuses, in order to stably operate UV irradiation processing at a constant illuminance, an illuminance feedback system is employed using a built-in UV sensor. However, the built-in UV sensor is subject to degradation with time due to exposure to UV light, and as a result, illuminance measured by the built-in UV sensor is shifted. Thus, the built-in UV sensor is necessarily calibrated periodically to compensate for the shifted illuminance measurement. Calibration is conducted using measurement data provided by another exterior UV sensor. Namely, a UV unit equipped with the built-in UV sensor is detached from a processing chamber, and placed above an exterior UV sensor, so that the exterior UV sensor is exposed to the UV lamp simultaneously with the built-in UV sensor.

FIG. 1 illustrates such a calibration method. FIG. 1(a) illustrates a schematic view of a conventional UV irradiation apparatus. The UV irradiation apparatus is comprised of a processing chamber 6 and a UV unit 1 mounted thereon. In the processing chamber 6, a heater table 5 is provided for supporting a substrate thereon. In the UV unit 1, a UV lamp 2 is provided for treating a substrate. A built-in UV sensor 3 is also provided in the UV unit 1 to measure illuminance emitted from the UV lamp. An illuminance signal outputted by the built-in UV sensor 3 is fed back to a power control system including a PLC (Power Line Communication) 4 which controls power of the UV lamp, so that even if the UV lamp 2 is degraded and emits less illuminance, the built-in UV sensor 3 catches the reduction of illuminance and the PLC 4 compensates for the reduction of illuminance by increasing power to the UV lamp. As a result, the substrate on the heater table is exposed to UV light with constant illuminance. However, the built-in UV sensor is also subject to degradation with time. Thus, the built-in UV sensor is required to be calibrated after every, e.g., 100 to 300 consecutive hours of irradiation. When calibration is conducted, as illustrated in FIG. 1(b), the UV unit 1 is separated from the processing chamber 6 and mounted on a measuring jig 8 equipped with an exterior UV sensor 7. The exterior UV sensor 7 is then exposed to illuminance emitted from the UV lamp 2, thereby measuring illuminance. The UV unit 1 is separated from the measuring jig 8 and placed back over the processing chamber 6. UV irradiation is then conducted, and the built-in UV sensor 3 is calibrated based on the illuminance measured by the exterior UV sensor 7. After the calibration, UV treatment is resumed.

However, since the above calibration is conducted under different environments, and also since the exterior UV sensor is provided in the measuring jig, the illuminance measured by the exterior UV sensor may not accurately represent the ideal illuminance measured by the built-in UV sensor. Further, such external calibration lowers productivity.

Any discussion of problems and solutions involved in the related art has been included in this disclosure solely for the purposes of providing a context for the present invention, and it should not be taken as an admission that any or all of the discussion were known at the time the invention was made.

SUMMARY

Consequently, in an aspect, an object of the present invention is to provide an in-situ calibration method of a UV feedback sensor (built-in UV sensor) which gives feedback to a UV power control system, wherein another UV sensor for calibration is provided inside a UV unit. The another UV sensor is exposed to UV light substantially less frequently than is the built-in UV sensor, and thus, the another UV sensor is not subject to substantial degradation and can calibrate the built-in UV sensor. In some embodiments, the another UV sensor is equipped with a shutter which is closed (i.e., blocking a UV receiving unit of the another UV sensor from UV light) when the another UV sensor is not measuring illuminance and which opens to measure illuminance. In some embodiments, the another UV sensor is exposed to UV light only when measuring illuminance for calibration of the built-in UV sensor. Since degradation of the another UV sensor is negligible or insubstantial due to the substantially less exposure to UV light as compared with the built-in UV sensor, and also since the another UV sensor is positioned in a vicinity of the built-in UV sensor inside the UV unit and can measure illuminance simultaneously with the built-in UV sensor, environmental or external errors of calibration can be eliminated, and calibration can be conducted highly accurately. Further, since the in-situ calibration can eliminate external calibration such as those using a measuring jig, and since the in-situ calibration can be conducted during UV treatment of a substrate, productivity can significantly be improved. Additionally, the in-situ calibration can easily be automated by following a predetermined sequence, thereby further improving productivity.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not necessarily to scale.

DETAILED DESCRIPTION

Figure 1:
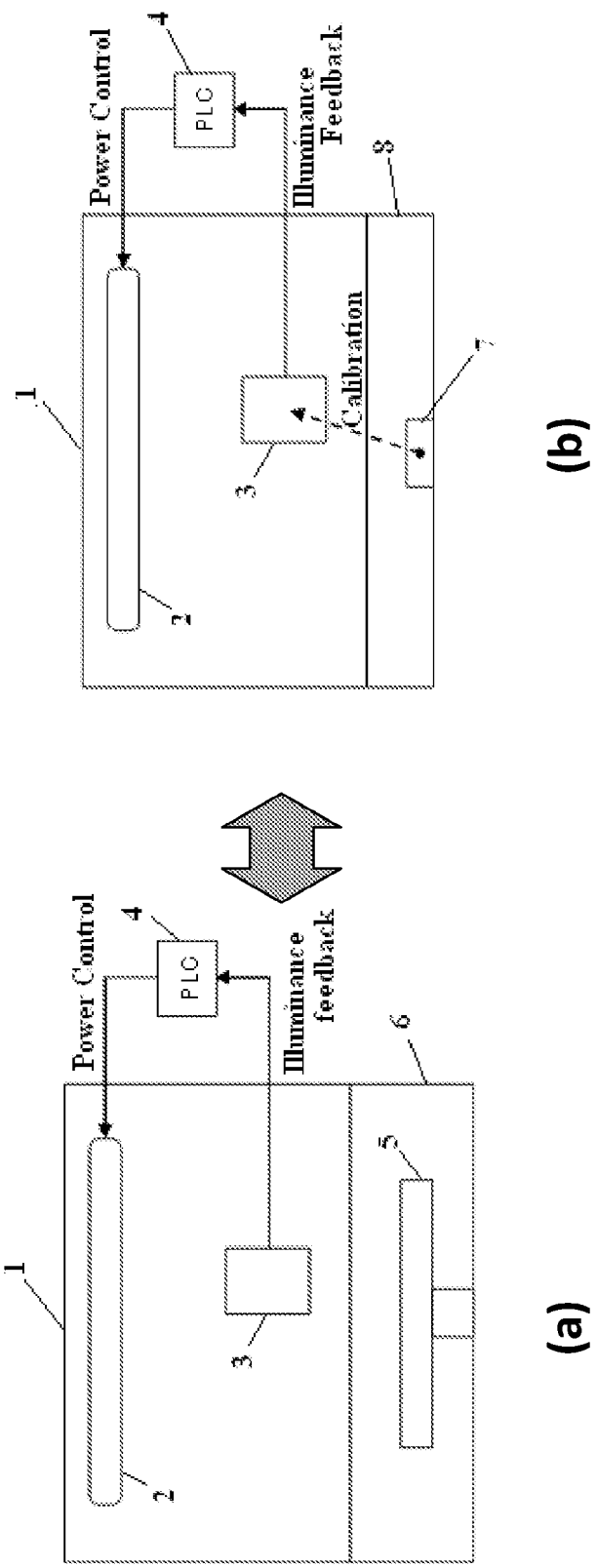
FIG. 1 illustrates a schematic view of a conventional UV irradiation apparatus (FIG. 1(a)), and a schematic view of a UV unit mounted on a measuring jig (FIG. 1(b)).

In the disclosure, "substantially equal", "substantially constant", or the like refers to a difference of less than 10%, less than 5%, less than 1%, or any ranges thereof, an undetectable difference, or any difference a skilled artisan would ordinarily and customarily consider to be insubstantial. Also in the disclosure, "substantially longer", "substantially different", or the like refers to a difference of at least 30%, 50%, 100%, 5-fold, 10-fold, 100-fold, 200-fold, or any ranges thereof, or any difference a skilled artisan would ordinarily and customarily consider to be substantial. Also, in this disclosure, "about" refers to inclusion of equivalents or insubstantial difference or any difference a skilled artisan would ordinarily and customarily consider to be "about" in addition to an exact value. In this disclosure, "gas" may include vaporized solid and/or liquid and may be constituted by a mixture of gases. Further, in this disclosure, any two numbers of a variable can constitute an applicable range of the variable, and any ranges indicated may include or exclude the endpoints. Also, "continuously" refers to continuously or consecutively as a designated step or treatment, at every cycle, continuously physically, continuously as a timeline, without interruption as a timeline, without changing treatment conditions, immediately thereafter, as a next active step or treatment, or without a discrete physical or chemical boundary between two structures in some embodiments. In some embodiments, "film" refers to a layer continuously extending in a direction perpendicular to a thickness direction substantially without pinholes to cover an entire target or concerned surface, or simply a layer covering a target or concerned surface. In some embodiments, "layer" refers to a structure having a certain thickness formed on a surface or a synonym of film. A film or layer may be constituted by a discrete single film or layer having certain characteristics or multiple films or layers, and a boundary between adjacent films or layers may or may not be clear and may be established based on physical, chemical, and/or any other characteristics, formation processes or sequence, and/or functions or purposes of the adjacent films or layers. In this disclosure, any defined meanings do not necessarily exclude ordinary and customary meanings in some embodiments.

Embodiments include, but are not limited to, a method for managing UV irradiation for treating substrates in the course of treating multiple substrates consecutively with UV light, comprising: (i) exposing a first UV sensor to the UV light at first intervals to measure illumination intensity of the UV light so as to adjust the illumination intensity to a desired level based on the measured illumination intensity; and (ii) exposing a second UV sensor to the UV light at second intervals to measure illumination intensity of the UV light so as to calibrate the first UV sensor by equalizing the illumination intensity measured by the first UV sensor substantially with the illumination intensity measured by the second UV sensor, wherein each second interval is longer than each first interval.

In some embodiments, each second interval is substantially longer than each first interval, and in some embodiments, a ratio of each first interval to each second interval is about 1/2 to about 1/100, or about 1/3 to about 1/20 (typically about 1/5 to about 1/10). In some embodiments, the ratio can be zero, meaning that exposing the first UV sensor is continuous. In some embodiments, the interval of exposure of the first UV sensor is about 1 hour to about 10 hours (about 2 hours to about 5 hours in some embodiments), and the interval of exposure of the second UV sensor is about 5 hours to about 200 hours (about 10 hours to about 100 hours in some embodiments).

In some embodiments, when the second UV sensor is exposed to the UV light, the first and second UV sensors are exposed simultaneously. In some embodiments, the first and second UV sensors are arranged side by side. In some embodiments, the first and second UV sensors have shutters which open when the first and second UV sensors are exposed, respectively.

In some embodiments, the substrate is placed in a processing chamber, on which a UV unit is detachably mounted, wherein a UV lamp for irradiating the UV light, and the first and second UV sensors are installed in the UV unit. In some embodiments, the substrate is a semiconductor substrate having a dielectric film formed thereon. In some embodiments, the UV light has a wavelength of about 365 nm. In some embodiments, the UV light has a wavelength of about 100 nm to 500 nm. In some embodiments, the illumination intensity of the UV light is about 100 to about 300 mW/m$^2$ as the power of a UV lamp per area of the substrate. In some embodiments, the illumination intensity of the UV light is about 50 to about 600 mW/m$^2$ as the power of a UV lamp per area of the substrate.

Another embodiment provides a method for processing substrates with UV light, comprising: (i) treating substrates consecutively with UV light, (ii) exposing a first UV sensor to the UV light at first intervals to measure illumination intensity of the UV light so as to adjust the illumination intensity to a desired level based on the measured illumination intensity; (iii) repeating steps (i) and (ii); and (iv) exposing a second UV sensor to the UV light at second intervals to measure illumination intensity of the UV light so as to calibrate the first UV sensor by equalizing the illumination intensity measured last by the first UV sensor substantially with the illumination intensity measured by the second UV sensor, wherein each second interval is longer than each first interval. Any of the disclosed embodiments can be applied to the another embodiment.

In some embodiments, when step (iv) is conducted, step (ii) is also conducted, thereby calibrating the first UV sensor for the next step (ii) by substantially equalizing the illumination intensities measured simultaneously by the first and second UV sensors. In some embodiments, the first and second UV sensors have shutters which open in steps (ii) and (iv), respectively.

Still another embodiment provides a UV unit for treating a substrate adapted to be detachably mounted on a processing chamber wherein the substrate is placed, comprising: (A) a UV lamp for irradiating UV light; (B) a first UV sensor adapted to be exposed to the UV light to measure illumination intensity of the UV light so as to adjust the illumination intensity to a desired level based on the measured illumination intensity; (C) a second UV sensor adapted to be exposed to the UV light to measure illumination intensity of the UV light so as to calibrate the first UV sensor by equalizing the illumination intensity measured by the first UV sensor substantially with the illumination intensity measured by the second UV sensor; and (D) a control unit for operating the first UV sensor at first intervals and the second UV sensor at second intervals, calibrating the first UV sensor based on the illumination intensity measured by the second UV sensor, and controlling power of the UV lamp based on the illumination intensity measured by the first UV sensor. Any of the disclosed embodiments can be applied to the above embodiment.

Figure 2:
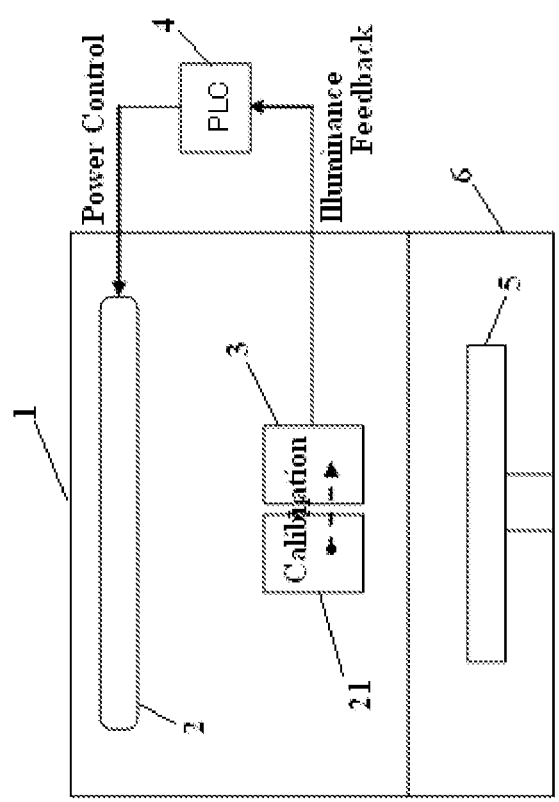
FIG. 2 illustrates a schematic view of a plasma CVD apparatus equipped with an in-situ calibration system according to an embodiment of the present invention.

FIG. 2 illustrates a schematic view of a plasma CVD apparatus equipped with an in-situ calibration system according to an embodiment of the present invention. The UV irradiation apparatus is comprised of a processing chamber 6 and a UV unit 1 mounted thereon. In the processing chamber 6, a heater table 5 is provided for supporting a substrate thereon. In the UV unit 1, a UV lamp 2 is provided for treating a substrate. A UV feedback sensor (built-in UV sensor) 3 which gives feedback to a power control system is also provided in the UV unit 1 to monitor illuminance emitted from the UV lamp. An illuminance signal outputted by the UV feedback sensor 3 is fed back to the power control system including a PLC (Power Line Communication) 4 which controls power of the UV lamp, so that even if the UV lamp 2 is degraded and emits less illuminance, the UV feedback sensor 3 catches the reduction of illuminance and the PLC 4 compensates for the reduction of illuminance by increasing power to the UV lamp. In this embodiment, a second UV sensor 21 which functions as a UV calibration sensor is provided in the UV unit 1. The UV calibration sensor 21 is positioned so that it is exposed to UV light in substantially the same manner as is the UV feedback sensor exposed. For example, the UV calibration sensor 21 and the UV feedback sensor are disposed side by side. Since the UV calibration sensor 21 is substantially less frequently exposed to UV light than is the UV feedback sensor, the degradation of the UV calibration sensor is negligible as compared with that of the UV feedback sensor. The output signal from the UV calibration sensor is used to calibrate the output signal from the UV feedback sensor, e.g., the output signal from the UV feedback sensor is adjusted so as to be matched with the output signal from the UV calibration sensor. As a result of the in-situ calibration, the UV feedback sensor does not require frequent external calibration and can be used for at least 300 consecutive hours of irradiation (in some embodiments, UV irradiation can be performed for at least 500 hours, 1,000 hours, or 2,000 hours, without calibration).

Figure 4:
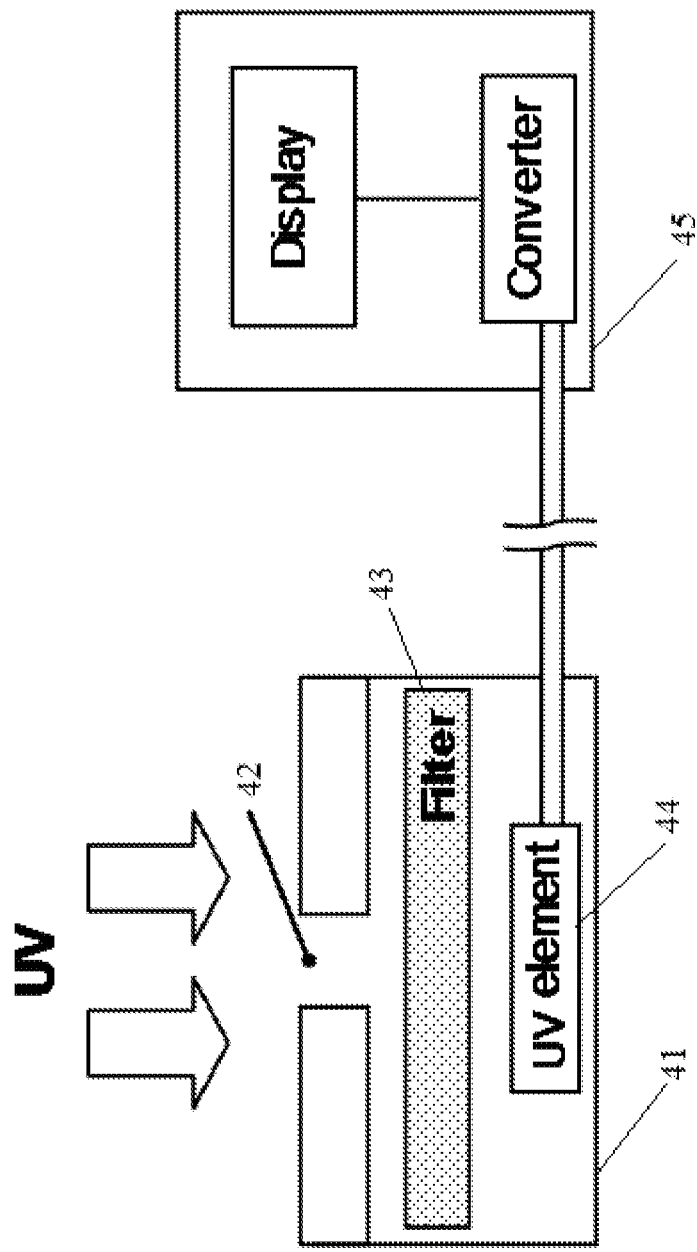
FIG. 4 illustrates a schematic view of a UV sensor according to an embodiment of the present invention.

The UV feedback sensor and the UV calibration sensor may have the same general structures. FIG. 4 illustrates a schematic view of a UV sensor according to an embodiment of the present invention. The UV sensor 41 comprises a focusing cover with a pin hole 42 through which light emitted from a broadband light source such as a high-pressure mercury lamp (which has a strong emission line for a certain wavelength for measuring the illuminance), an optical filter 43 through which certain wavelengths of the light passing through the pin hole 42 are selectively filtered out, and a silicon photodiode 44 which receives the filtered light having wavelengths for measuring the illuminance of the light and converts a signal to photoelectric current and outputs it to a display unit 45 and a power control unit such as the PLC 4 shown in FIG. 2 via a cable. In the display unit 45, the photoelectric current is converted to voltage at a converter, and outputted to a display which indicates values of illuminance. Since the optical filter is exposed to high-energy UV light for a long period of time, the light transmittance ratio of the filter decreases; as a result, the value of photoelectric current outputted from the photodiode is shifted. Thus, calibration is required. In some embodiments, for in-situ calibrating the UV feedback sensor, when the signal received by the UV feedback sensor is converted to photoelectric current, outputted from the UV feedback sensor to a converter, and converted to voltage at the converter, the conversion from photoelectric current to voltage is adjusted using a trimmer resistor (semi-fixed resistor) of the converter based on the photoelectric current value outputted from the UV calibration sensor.

Figure 5A:
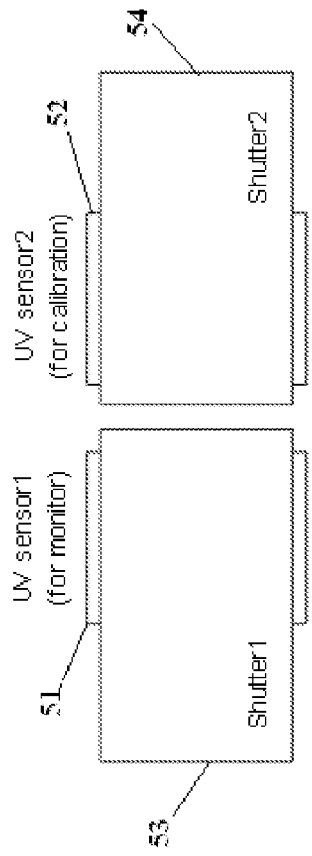
FIG. 5A illustrates a first and second UV sensors where shutters of both sensors are closed.
Figure 5B:
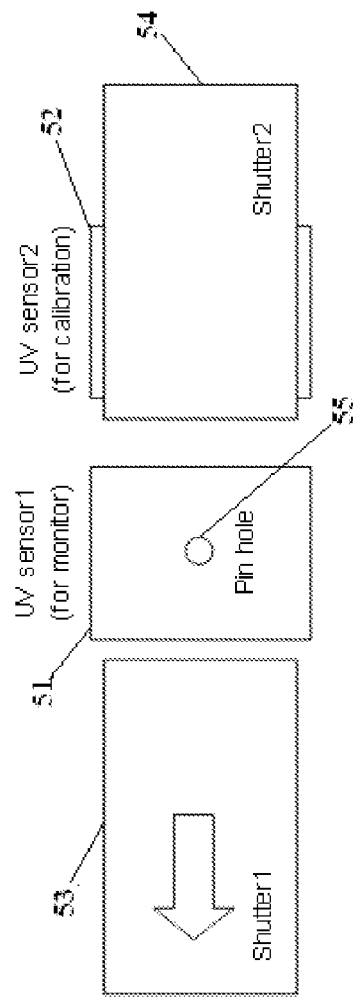
FIG. 5B illustrates first and second UV sensors where a shutter of the first sensor opens and a shutter of the second sensor remains closed according to an embodiment of the present invention.

In some embodiments, the UV calibration sensor has a shutter which is normally closed to cover the pin hole. The shutter opens only when measuring illuminance for in-situ calibration so that the total exposure time remains low as compared with the UV feedback sensor. In some embodiments, the shutter is provided not only to the UV calibration sensor but also to the UV feedback sensor. FIG. 5A illustrates a first UV sensor (UV feedback sensor) 51 and a second UV sensor (UV calibration sensor) 52 where shutters 53, 54 of both sensors are closed. FIG. 5B illustrates the first and second UV sensors where the shutter 53 of the first sensor opens by sliding for measuring illuminance through a pin hole 55, and the shutter 54 of the second sensor remains closed according to an embodiment of the present invention. In some embodiments, the shutter is made of aluminum, aluminum alloy, aluminum ceramic, etc.

Figure 3:
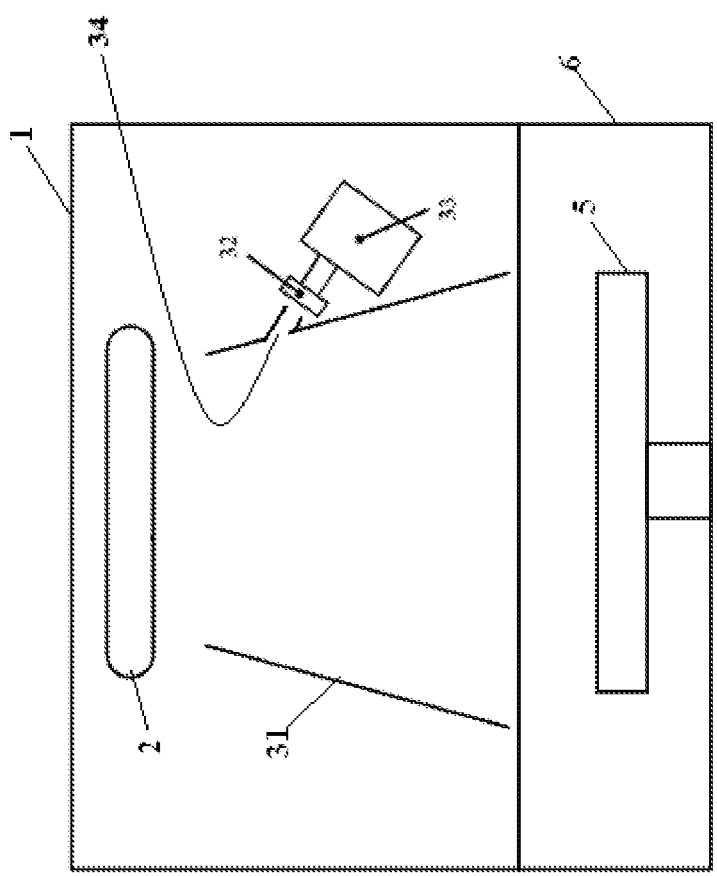
FIG. 3 illustrates a schematic view of a plasma CVD apparatus, which shows a location of a UV sensor according to an embodiment of the present invention.

In some embodiments, the UV sensors are disposed side by side and behind a reflection mirror. FIG. 3 illustrates a schematic view of a plasma CVD apparatus, which shows a location of a UV sensor according to an embodiment of the present invention. In the UV unit 1, a mirror 31 is disposed along an inner wall of the UV unit 1 and surrounds and defines a light emission space. The mirror has a hole 34, and a UV sensor 33 is disposed behind the mirror 31 and connected to the hole 34 via a light-guiding tube, so that the UV sensor receives light when a shutter 32 is opened, illuminance of which light represents illuminance of light received by the substrate on the heater 5 in the processing chamber 6. In some embodiments, the sensor is angled (e.g., about 30° to about 45°) so that light is transmitted from the lamp to the sensor through the light-guiding tube and the pin hole.

In some embodiments, a calibration sequence is as follows:

Step 1: The UV lamp 1 is ON and emits UV light.

Step 2: After the emission is stabilized (e.g., 10 seconds to 200 seconds, typically 100 seconds to 150 seconds), the shutters 53 and 54 open, thereby monitoring illuminance of the lamp using the UV sensors 51 and 52. After the monitoring, the shutters are closed.

Step 3: Based on the difference between the illuminances monitored by the UV sensors 51 and 52, a correction coefficient or factor to multiply the illuminance monitored by the UV sensor 51 (UV feedback sensor) is automatically calculated with reference to the illuminance monitored by the UV sensor 52 (UV calibration sensor).

Step 4: The illuminance monitored by the UV sensor 51 is corrected by the correction coefficient or factor in a circuit including a photodiode of the UV sensor 51.

Step 5: The shutters 53 and 54 open, and the UV sensors 51 and 52 monitor illuminance, confirming that the illuminance monitored by the UV sensor 51 is substantially the same as that by the UV sensor 52.

Figure 6:
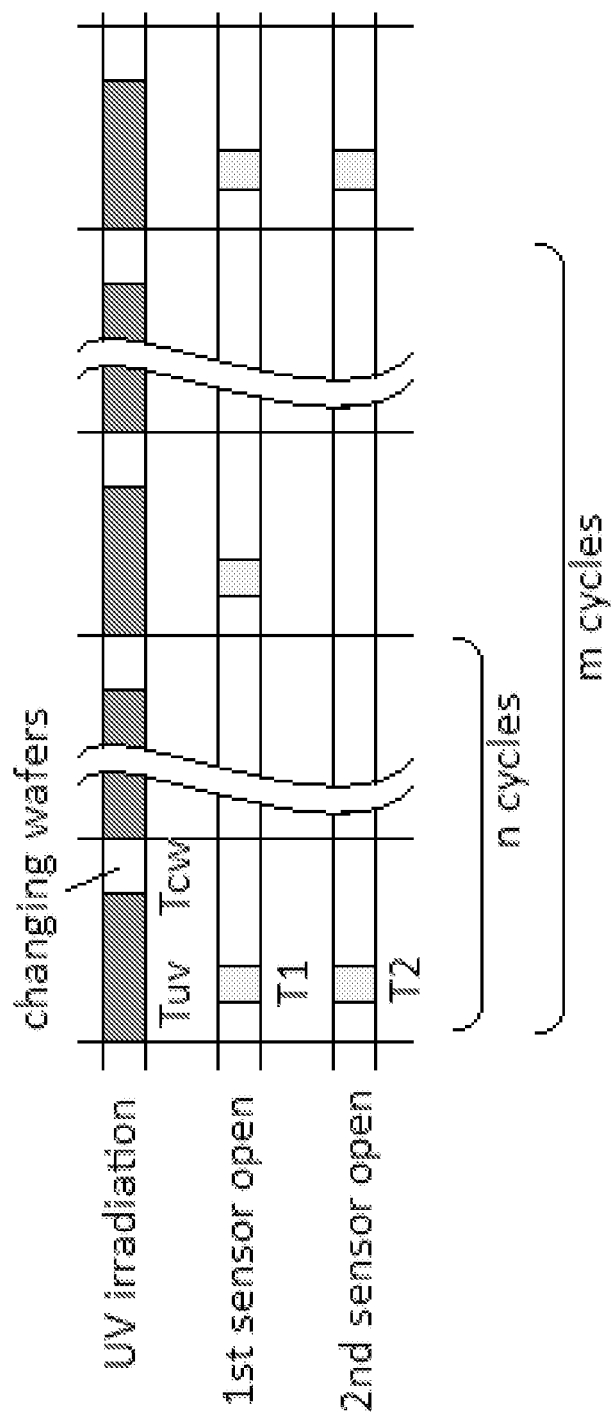
FIG. 6 illustrates a timing chart of monitoring illuminance using a first sensor (UV feedback sensor) and a second sensor (UV calibration sensor) according to an embodiment of the present invention.

FIG. 6 illustrates a timing chart of monitoring illuminance using a first sensor (UV feedback sensor) and a second sensor (UV calibration sensor) according to an embodiment of the present invention. After placing a substrate (or substrates) on a heater, UV irradiation begins and continues for a time period of Tuv. The time period of Tuv varies depending on what type of irradiation is conducted, what type of substrate is treated, etc. For example, for annealing a low-k film on a substrate to improve mechanical strength and lower its dielectric constant, Tuv may be in a range of about one minute to about one hour. In some embodiments, it takes several seconds to stabilize illuminance, and thus, in FIG. 6, after the stabilization period is over (UV irradiation is stabilized), the shutter of the $1^{st}$ sensor opens, and the $1^{st}$ sensor monitors illuminance for a time period of T1, and also, the shutter of the $2^{nd}$ sensor opens, and the $2^{nd}$ sensor monitors illuminance for a time period of T2. In some embodiments, the stabilization period can be zero. T1 and T2 are long enough to stably monitor illuminance such as at least about 5 seconds, and in some embodiments, the time period is short enough to monitor illuminance without thermal influence due to UV light exposure. After the irradiation treatment, UV irradiation discontinues for a time period of Tcw for changing substrates. In some embodiments, after this cycle, the same cycle is repeated once to confirm that calibration of the $1^{st}$ sensor is complete. The calibration sequence may be conducted as described above as Steps 1 to 5. In some embodiments, Tuv is in a range of about one minute to about one hour, Tcw is in a range of about a few seconds to about 20 seconds (typically no more than 10 seconds), T1 is in a range of about 5 seconds to about 10 seconds, and T2 is in a range of about 5 seconds to about 10 seconds.

The UV irradiation cycle is repeated n times and then, the shutter of the $1^{st}$ sensor opens again to monitor illuminance (the shutter of the $2^{nd}$ sensor remains closed). That is, the shutter of the $1^{st}$ sensor opens every n cycles to monitor illuminance so that UV irradiation is controlled substantially at a constant intensity. The shutter of the $2^{nd}$ sensor opens again to monitor illuminance and to calibrate the $1^{st}$ sensor. The shutter of the $2^{nd}$ sensor opens every m cycles to repeat the calibration sequence. In some embodiments, n is in a range of 1 to 25, whereas m is in a range of 25 to 250 (m>n). In some embodiments, n cycle corresponds to one lot. In some embodiments, n/m is 1/3 to 1/20 (including 1/5 to 1/10). In FIG. 6, the interval of the $1^{st}$ sensor can be expressed as (nTuv-T1), and the interval of the $2^{nd}$ sensor can be expressed as (mTuv-T2).

FIG. 2 is a schematic view of a UV unit combined with a processing chamber, desirably in conjunction with controls programmed to conduct the sequences described above, which can be used in an embodiment of the present invention. The skilled artisan will appreciate that the apparatus includes one or more controller(s) (not shown) programmed or otherwise configured to cause UV irradiation processes described elsewhere herein to be conducted. The controller(s) will be communicated with the various power sources, heating systems, robotics and gas flow controllers or valves of the chamber, as will be appreciated by the skilled artisan. In some embodiments, another UV calibration sensor can be used for calibrating the first UV calibration sensor.

In the present disclosure where conditions and/or structures are not specified, the skilled artisan in the art can readily provide such conditions and/or structures, in view of the present disclosure, as a matter of routine experimentation.

Figure 8:
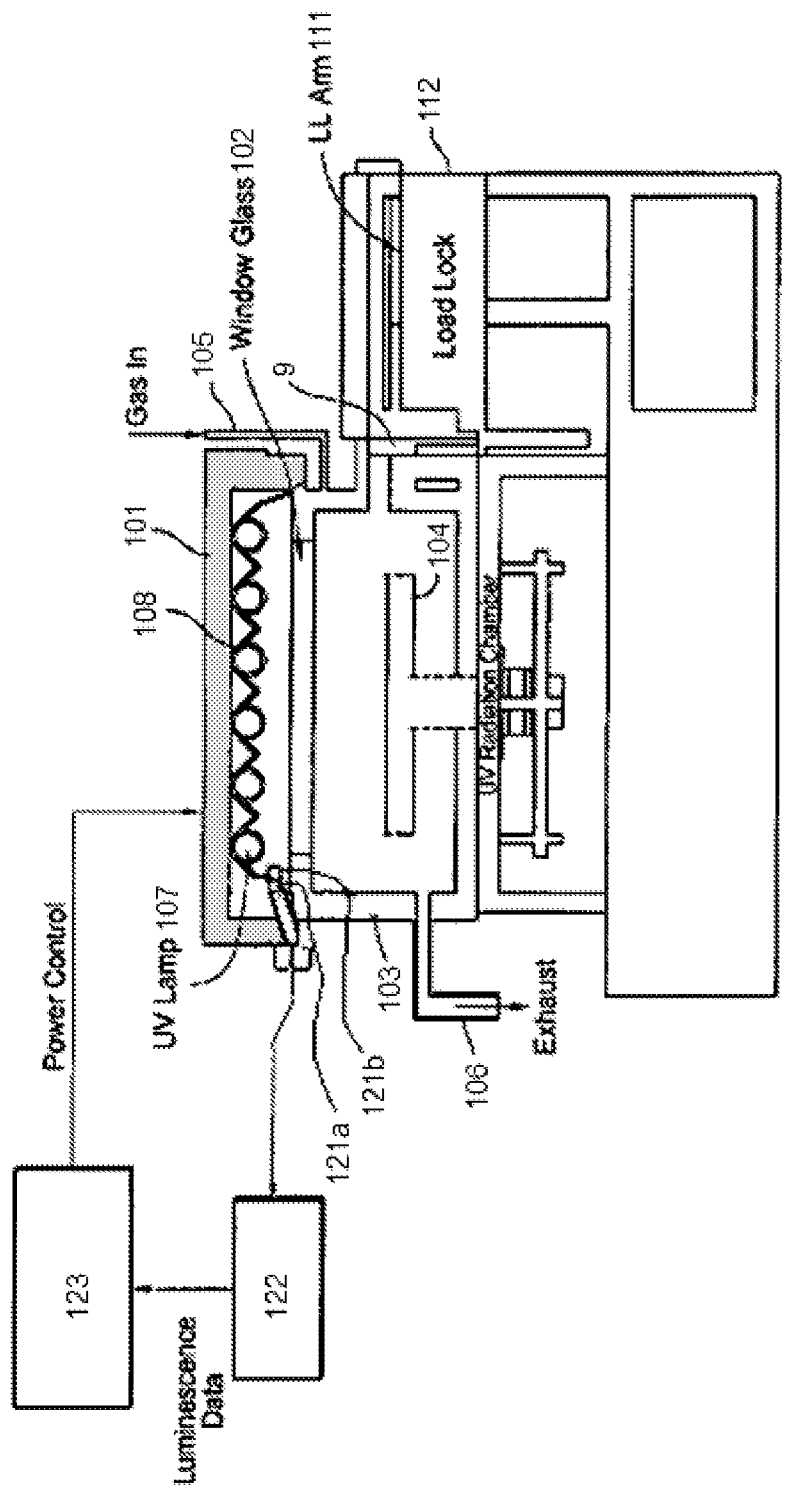
FIG. 8 illustrates a schematic view of a UV irradiation apparatus according to an embodiment.

FIG. 8 illustrates a UV irradiation apparatus equipped with a UV irradiation calibration system according to an embodiment. The apparatus comprises a UV unit 101 provided with a UV lamp 107; an irradiation window 102; a processing chamber 103; a gas inlet ring (not illustrated) provided in the interior wall of the processing chamber and connected to a gas introduction pipe 105; a heater table 104; a vacuum pump (not illustrated) connected to an exhaust port 106; and a pressure control valve (not illustrated) installed inside the exhaust port. The UV unit 101 is detachably mounted on the processing chamber 103, and the transmission window 102 constitutes a ceiling of the processing chamber 103. The apparatus shown in FIG. 8 is connected to a load lock chamber 112, and a loading/unloading robot 111 inside the load lock chamber is used to load/unload a substrate. It should be noted that the apparatus is not at all limited to this figure and any conventional or suitable apparatus can be used as long as it is capable of irradiating UV light.

For example, the UV irradiation apparatuses disclosed in U.S. patent publication No. 2004/0079960, No. 2004/0080697, and No. 2009/0023229 can be used in embodiments of the present invention. The disclosures of the above publications are herein incorporated by reference in their entirety.

The apparatus in FIG. 8 is explained in further detail. The processing chamber 103 is designed to permit control of its internal pressure over a range from vacuum to near atmospheric pressure, and has the UV irradiation unit 101 placed on top.

There are UV lamps 107 capable of emitting UV light continuously and in pulses and the heater 104 is installed in a manner facing and in parallel with the UV lamps, while the irradiation window glass 102 is installed between the UV lamps and heater in a manner facing and in parallel with the UV lamps and heater. The irradiation window 102 is used to achieve uniform UV irradiation, and any material can be used, such as synthetic quartz, as long as the material is able to isolate the reactor from the atmosphere while transmitting UV light. In some embodiments, multiple tubular UV lamps 107 are placed in parallel inside the UV irradiation unit. As shown in FIG. 8, these lamps are arranged optimally to achieve uniform illuminance, while a reflection plate 108 is provided to guide the UV light emitted by each UV lamp to be properly reflected onto the thin film, and this reflection plate is designed so that its angle can be adjusted to achieve uniform illuminance. This apparatus isolates, by means of a flange (not illustrated) in which the irradiation window glass 102 is provided, the chamber whose internal pressure can be controlled over a range from vacuum to near atmospheric pressure (substrate processing part) and the UV lamps are installed in the aforementioned chamber to emit UV light continuously or in pulses (UV emitting part). The structure of the UV lamps allows them to be easily removed and replaced. Gas is introduced through the flange and multiple gas inlets are provided in a symmetrical arrangement designed to achieve a uniform processing atmosphere.

In some embodiments, the specific UV irradiation process is as follows: create an atmosphere in the chamber with a pressure of approx. 0.1 Torr to near atmospheric pressure (including 1 Torr, 10 Torr, 50 Torr, 100 Torr, 1,000 Torr and any values between the foregoing numbers) using a gas selected from Ar, CO, $CO_2$, $C_2H_4$, $CH_4$, $H_2$, He, Kr, Ne, $N_2$, $O_2$, Xe, alcohol gases and organic gases; place a semiconductor substrate, being the processing target, onto the heater that has been set to a temperature of approx. 0 to approx. 650° C.

(including 10° C., 50° C., 100° C., 200° C., 300° C., 400° C., 500° C., 600° C. and any values between the foregoing numbers, but preferably 300° C. to 450° C.), by loading the substrate from the substrate transfer port through a gate valve 9; and irradiate UV light onto the thin film formed on the semiconductor substrate by maintaining an appropriate distance (1 cm to 100 cm) from the UV lamps and emitting UV light with a wavelength of approx. 100 nm to approx. 400 nm (including 150 nm, 200 nm, 250 nm, 300 nm, 350 nm and any values between the foregoing numbers, but preferably approx. 200 nm) at an output of approx. 1 mW/cm$^2$ to approx 1,000 mW/cm$^2$ (including 10 mW/cm$^2$, 50 mW/cm$^2$, 100 mW/cm$^2$, 200 mW/cm$^2$, 500 mW/cm$^2$, 800 mW/cm$^2$ and any values between the foregoing numbers) and frequency of approx. 1 Hz to approx. 1,000 Hz (including 10 Hz, 100 Hz, 200 Hz, 500 Hz and any values between the foregoing numbers) either continuously or in pulses. The irradiation time is approx. 1 sec to approx. 60 min (including 5 sec, 10 sec, 20 sec, 50 sec, 100 sec, 200 sec, 500 sec, 1,000 sec, 2,000 sec and any values between the foregoing numbers). The chamber is evacuated from the exhaust port.

In some embodiments, this semiconductor manufacturing apparatus performs a series of processing steps as described above through an automatic sequence, where the processing steps include introduction of gas, irradiation of UV light, stopping of irradiation, and stopping of gas. The intensity (illuminance) of UV light can be changed over a range of 1 to 100% and is controlled according to the applicable recipe.

The apparatus shown in FIG. 8 also has a mechanism to adjust the power input to the lamp to allow for stable operation of the UV apparatus by maintaining the illuminance of UV light at a constant level, where, to be specific, the power input is increased to compensate for any drop in the illuminance not only due to degradation of the UV lamp but also due to degradation of a UV sensor (or a UV illuminometer). This apparatus has an illuminance measuring capability as the apparatus is equipped, in its interior wall, with UV illuminometers 121a, 121b for measuring illuminance before the transmission window glass. The illuminometers 121a, 121b are installed side by side above the transmission window glass. The illuminometers 121a, 121b are part of the UV unit. The illuminometer 121a monitors directly the illuminance of the lamp to detect degradation of the lamp, and to adjust the power of the UV lamp to compensate for the diminished intensity of illuminance. The other illuminometer 121b also monitors directly the illuminance of the lamp, but, unlike the illuminometer 121a, the monitoring by the illuminometer 121b is conducted solely for calibrating the illuminometer 121a. For that purpose, the monitoring by the illuminometer 121b is conducted significantly less frequently than is the illuminometer 121a, so that the degradation of the illuminometer 121b is insubstantial or negligible. As a result, the illuminometer 121a is periodically calibrated by the illuminometer 121b so that the illuminance can be kept substantially constant.

The illuminometer 121a can calculate the difference from the reference value measured by the illuminometer 121a which is measured initially when the illuminometer 121a begins monitoring the illuminance. The calculated difference is used to determine the amount of drop in transmissivity caused by the lamp degradation. The illuminometer feeds back the measured data to a power control system 123 of the UV unit through an illuminance monitor unit 122, so as to maintain at a constant level the illuminance. The illuminometer 121a is subject to degradation. The illuminometer 121b is not subject to substantial degradation due to the measuring frequency which is lower than a threshold of causing sensor degradation by exposure to UV light. The illuminance measured by the illuminometer 121a is calibrated by the illuminometer 121b in a manner that the illuminance measured by the illuminometer 121a is matched with that measured by the illuminometer 121b so as to avoid overcompensation caused by degradation of the illuminometer 121a.

If outgas generates from the thin film on the semiconductor substrate as a result of UV irradiation, it deposits on the irradiation window glass made of synthetic quartz or the like, as well as on the interior walls of the chamber. Contamination deposited on the irradiation window absorbs UV light and causes the curing efficiency to drop. In view of the above, the processing chamber 103 can be equipped with another illuminometer(s) below the transmission window glass to measure the illuminance after the transmission window glass, so that the power of the UV lamp can further be adjusted according to the measured illuminance by the illuminometer provided below the transmission window glass. In some embodiments, no illuminometer is provided in the processing chamber.

In some embodiments, the transmission window 102 and the inner wall of the processing chamber can be clean, e.g., by the method disclosed in U.S. Patent Application Publication No. 2009/0023229.

The present invention will be explained in detail with reference to specific examples which are not intended to limit the present invention. The numerical numbers applied in specific examples may be modified by a range of at least ±50%, wherein the endpoints of the ranges may be included or excluded.

EXAMPLES

Example 1

Illuminance Retention Ratio of UV Feedback Sensor and UV Calibration Sensor

An apparatus shown in FIG. 2 was used, wherein the UV lamp was a mercury lamp. A UV feedback sensor and a UV calibration sensor were of the same type for measuring light having a wavelength of 365 nm. Both the sensors were provided with shutters which were capable of opening for monitoring illuminance. The UV lamp was turned on by inputting 60% of full power for 120 seconds, and then 100% of full power for 600 seconds. This cycle of 60% and 100% constituted one cycle, and the UV lamp continuously emitted UV light by repeating the cycle for this experiment wherein no substrate was placed on a heater. By using a pulse of 60% of full power, overheating the apparatus was avoided.

The illuminance from the UV lamp changed over time due to deterioration of the UV lamp itself. First, in order to determine deterioration of the UV lamp, illuminance was measured using the UV calibration sensor which was exposed to UV light only a few times (and thus, the UV calibration sensor was not subject to any deterioration due to UV light exposure). The results are shown in Table 1 below.

TABLE 1

|  | Duration of UV irradiation (hours) | | |
| --- | --- | --- | --- |
|  | 0 | 100 | 200 |
| Lamp illuminance (a.u.) | 100.0% | 96.1% | 92.9% |

Table 1 shows that illuminance from the UV lamp decreased over time relative to the initial illuminance.

Next, the shutter of the UV feedback sensor opened for about 10 seconds every one hour, whereas the shutter of the UV calibration sensor opened for about 10 seconds every five hours for monitoring illuminance. The results are shown in Tables 2 and 3 below.

TABLE 2

|  | Duration of UV irradiation (hours) | | |
| --- | --- | --- | --- |
|  | 0 | 100 | 200 |
| Lamp illuminance (a.u.) | 100.0% | 96.1% | 92.9% |
| UV calibration sensor reading (a.u.) | 100% | 95.7% | 92.7% |
| UV calibration sensor deterioration (Δ) | 0.0% | 0.4% | 0.2% |

As shown in Table 2, no substantial deterioration was observed in the UV calibration sensor which was exposed to UV light every 5 hours.

TABLE 3

|  | Duration of UV irradiation (hours) | | |
| --- | --- | --- | --- |
|  | 0 | 100 | 200 |
| UV calibration sensor reading (a.u.) | 100.0% | 95.7% | 92.7% |
| UV feedback sensor reading (a.u.) | 100% | 88.2% | 82.6% |
| UV feedback sensor deterioration (Δ) | 0.0% | 7.5% | 10.1% |

As shown in Table 3, substantial deterioration was observed in the UV feedback sensor which was exposed to UV light every one hour. Thus, by using the UV calibration sensor, the UV feedback sensor can effectively and accurately be calibrated, which can eliminate external calibration.

Example 2

Operation Rate of Using UV Feedback Sensor and UV Calibration Sensor

The same system as in Example 1 was used, and the shutter of the UV feedback sensor opened every 10 hours, whereas the shutter of the UV calibration sensor opened every 100 hours. No external calibration was conducted. The time used for this in-situ calibration was considered as downtime, and the operation rate was determined. The operation rate was defined as a ratio of (T-D)/T per month (F: total operation time of the UV lamp, D: downtime).

In comparison, the same system as in Example 1 and an external UV sensor of the same type were used. The shutter of the UV feedback sensor opened every 10 hours, whereas the shutter of the UV calibration sensor remained closed. External calibration was conducted every 100 hours, 200 hours, and 300 hours, using the external UV sensor. The time used for this external calibration was considered as downtime, and the operation rate was determined.

Figure 7:
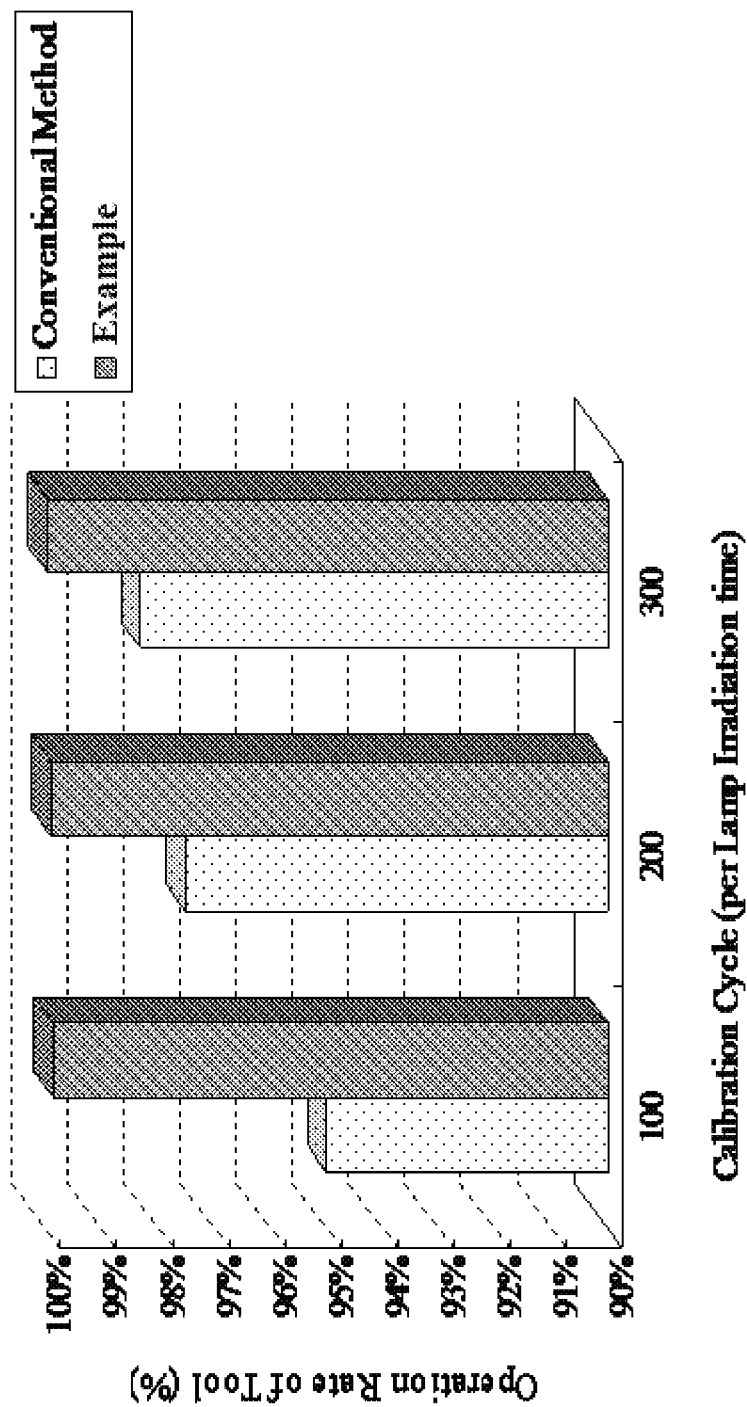
FIG. 7 is a graph showing relationships between operation rate of tool and calibration cycle (hours of one cycle) in a conventional method and an embodiment of the present invention.

The results are shown in FIG. 7. When the external calibration was conducted every 100 hours, 200 hours, and 300 hours, the operation rates were less than 95%, about 97%, and about 98%, respectively. In contrast, when the in-situ calibration was conducted, the operation rate was nearly 100%.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A method for managing UV irradiation for treating substrates in the course of treating multiple substrates consecutively with UV light, comprising:
   exposing a first UV sensor to the UV light at first intervals to measure illumination intensity of the UV light so as to adjust the illumination intensity to a desired level based on the measured illumination intensity;
   exposing a second UV sensor to the UV light at second intervals to measure illumination intensity of the UV light; and
   calibrating the first UV sensor by the second UV sensor to equalize the illumination intensity measured by the first UV sensor substantially with the illumination intensity measured by the second UV sensor, wherein each second interval is longer than each first interval, wherein the first UV sensor and the second UV sensor are disposed inside the same UV unit for treating a substrate adapted to be detachably mounted on a processing chamber wherein the substrate is placed.

2. The method according to claim 1, wherein a ratio of each first interval to each second interval is 1/2 to about 1/100.

3. The method according to claim 2, wherein the interval of the first UV sensor is about 1 hours to about 10 hours, and the interval of the second UV sensor is about 5 hours to about 200 hours.

4. The method according to claim 1, wherein when the second UV sensor is exposed to the UV light, the first and second UV sensors are exposed simultaneously.

5. The method according to claim 1, wherein the first and second UV sensors are arranged side by side.

6. The method according to claim 1, wherein the first and second UV sensors have shutters which open when the first and second UV sensors are exposed, respectively.

7. The method according to claim 1, wherein the substrate is placed in a processing chamber, on which a UV unit is detachably mounted, wherein a UV lamp for irradiating the UV light, and the first and second UV sensors are installed in the UV unit.

8. The method according to claim 1, wherein the substrate is a semiconductor substrate having a dielectric film formed thereon.

9. The method according to claim 1, wherein the UV light has a wavelength of about 365 nm.

10. The method according to claim 1, wherein the illumination intensity of the UV light is about 100 to about 300 mW/m$^2$ as the power of a UV lamp per area of the substrate.

11. A method for processing substrates with UV light, comprising:
   (i) treating substrates consecutively with UV light,
   (ii) exposing a first UV sensor to the UV light at first intervals to measure illumination intensity of the UV light so as to adjust the illumination intensity to a desired level based on the measured illumination intensity;
   (iii) repeating steps (i) and (ii);
   (iv) exposing a second UV sensor to the UV light at second intervals to measure illumination intensity of the UV light; and
   (v) calibrating the first UV sensor by the second UV sensor to equalize the illumination intensity measured last by the first UV sensor substantially with the illumination intensity measured by the second UV sensor, wherein each second interval is longer than each first interval, wherein the first UV sensor and the second UV sensor are disposed inside the same UV unit for treating a substrate adapted to be detachably mounted on a processing chamber wherein the substrate is placed.

12. The method according to claim 11, wherein a ratio of each first interval to each second interval is 1/2 to about 1/100.

13. The method according to claim 12, wherein the interval of the first UV sensor is about 1 hour to about 10 hours, and the interval of the second UV sensor is about 5 hours to about 200 hours.

14. The method according to claim 11, wherein when step (iv) is conducted, step (ii) is also conducted, thereby calibrating the first UV sensor for the next step (ii) by substantially equalizing the illumination intensities measured simultaneously by the first and second UV sensors.

15. The method according to claim 14, wherein the first and second UV sensors are arranged side by side.

16. The method according to claim 11, Wherein the first and second UV sensors have shutters which open in steps (ii) and (iv), respectively.

17. The method according to claim 11, wherein the substrate is a semiconductor substrate having a dielectric film formed thereon.

18. A UV unit for treating a substrate adapted to be detachably mounted on a processing chamber wherein the substrate is placed, comprising:
 a UV lamp for irradiating UV light;
 a first UV sensor adapted to be exposed to the UV light to measure illumination intensity of the UV light so as to adjust the illumination intensity to a desired level based on the measured illumination intensity;
 a second UV sensor adapted to be exposed to the UV light to measure illumination intensity of the UV light so as to calibrate the first UV sensor by equalizing the illumination intensity measured by the first UV sensor substantially with the illumination intensity measured by the second UV sensor, wherein both the first UV sensor and the second UV sensor are disposed inside the UV unit; and
 a control unit for operating the first UV sensor at first intervals and the second UV sensor at second intervals, wherein each second interval is longer than each first interval, calibrating the first UV sensor based on the illumination intensity measured by the second UV sensor, and controlling power of the UV lamp based on the illumination intensity measured by the first UV sensor.

19. The UV unit according to claim 18, wherein the UV light has a wavelength of about 365 nm.

20. The UV unit according to claim 18, wherein the illumination intensity of the UV light is about 100 to about 300 $mW/m^2$ as the power of the UV lamp per area of the substrate.

* * * * *